(12) United States Patent
Guthrie

(10) Patent No.: US 10,184,799 B2
(45) Date of Patent: Jan. 22, 2019

(54) SYSTEMS AND METHODS FOR TARGETING OBJECTS OF INTEREST IN DENIED GPS ENVIRONMENTS

(71) Applicant: The Boeing Company, Chicago, IL (US)

(72) Inventor: Richard B. Guthrie, Orlando, FL (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 15/180,266

(22) Filed: Jun. 13, 2016

(65) Prior Publication Data
US 2017/0356720 A1    Dec. 14, 2017

(51) Int. Cl.
| | |
|---|---|
| *G06F 19/00* | (2018.01) |
| *G01C 21/20* | (2006.01) |
| *G01S 17/87* | (2006.01) |
| *G01S 17/42* | (2006.01) |

(52) U.S. Cl.
CPC .............. *G01C 21/20* (2013.01); *G01S 17/42* (2013.01); *G01S 17/875* (2013.01)

(58) Field of Classification Search
CPC ..... G01S 13/426; G01S 13/753; G01S 13/755
USPC .......................... 702/150, 155, 182–185, 188
See application file for complete search history.

(56) References Cited

U.S. PATENT DOCUMENTS

| | | | |
|---|---|---|---|
| 5,123,327 A | 6/1992 | Alston et al. | |
| 5,347,910 A | 9/1994 | Avila et al. | |
| 7,142,981 B2 | 11/2006 | Hablani | |
| 7,154,591 B2 | 12/2006 | Muenter et al. | |
| 8,675,186 B2 | 3/2014 | Guthrie | |
| 2008/0055154 A1* | 3/2008 | Martucci | G01S 5/0027 342/357.55 |

* cited by examiner

*Primary Examiner* — Edward Raymond
(74) *Attorney, Agent, or Firm* — Ostrager Chong Flaherty & Broitman P.C.

(57) ABSTRACT

Systems and methods that enable a targeting system operator, with no access to GPS signals, to self-locate using one or two landmarks and then geolocate an object-of-interest (OOI) using its own position and attitude and the range to the OOI. In the absence of GPS signals, the coordinates of the position of the targeting system can be calculated using a self-location algorithm either: (1) based on a measured direction and a measured range to one landmark and known coordinates of the position of the landmark; or (2) via triangulation based on two landmarks with respective known coordinates and respective measured headings. The coordinates of the position of the OOI can then be calculated using a geolocation algorithm based on the calculated coordinates of the position of the targeting system, and a measured direction and a measured range to the OOI. The calculated coordinates of the position of the OOI can then be sent to a weapons programmer by digital or voice message.

20 Claims, 7 Drawing Sheets

SYSTEMS AND METHODS FOR TARGETING OBJECTS OF INTEREST IN DENIED GPS ENVIRONMENTS

STATEMENT REGARDING FEDERALLY SPONSORED RESEARCH OR DEVELOPMENT

This invention was made with government support under Contract No. FA8629-12-C-2421 awarded by The Department of Defense. The government has certain rights in the invention.

BACKGROUND

This disclosure generally relates to systems and methods for targeting an object of interest (OOI). In particular, this disclosure generally relates to systems and methods for targeting an OOI when a targeting system operator has no access to global positioning system (GPS) signals.

Typically, before an OOI can be targeted, the geolocation of the targeting system must be determined. Many military devices and targeting tools rely on GPS signals to enable geolocation of first the targeting system and then the OOI. However, some environments do not have GPS access (for example, in valleys between mountains). In these situations, military personnel must maintain the ability to target an OOI in order to accomplish mission goals.

There is a need for systems and methods that would enable an operator of a targeting system to determine the geolocation of an OOI when GPS signals are unavailable.

SUMMARY

The subject matter disclosed in detail below is directed to systems and methods that enable an operator of a targeting system to geolocate an OOI when GPS signals are unavailable. The targeting system disclosed in detail below has the ability to geolocate an OOI using its own position (acquired without access to GPS signals) and attitude and the range to the OOI. Enabling technologies for the targeting system disclosed in detail below include the following: an attitude determination unit (ADU) providing heading, pitch attitude, and roll attitude of the line-of-sight (LOS) (these attitude angles collectively form the attitude of the targeting system); a rangefinder providing range along the LOS; and coordinates of known landmarks to allow calculation of targeting system self-location (i.e., position coordinates) when GPS signals are unavailable given either the bearing (i.e., azimuth angle) and elevation angle of the lines-of-sight to two landmarks or the bearing (i.e., azimuth angle) and elevation angle of the line-of-sight to one landmark and the range to that landmark. As used herein, the term "attitude determination unit" is a sensor that reports local geodetic angles (local geodetic is generally North/East/Up or North/West/Up relative to its body). Preferably, the targeting system also comprises: a self-location sensor, e.g., a GPS receiver and antenna (for self-location when GPS signals are available); an imager, or imagers, typically magnified, to allow the operator to orient the LOS; an overlay symbology function for the imager display to show ongoing knowledge of directions to objects; and an ability to retain mechanical co-alignment of the ADU, rangefinder, and imager(s) to achieve a common system LOS.

This disclosure is directed to systems and methods that enable a targeting system operator, with no access to GPS signals, to self-locate using one or two landmarks and then geolocate an OOI using his own position and attitude and the range to the OOI. In the absence of GPS signals, the targeting system coordinates can be calculated using a self-location algorithm either: (1) based on a direction (i.e., azimuth and elevation angles of the line-of-sight) to one landmark measured by the ADU (e.g., a digital magnetic compass), a range to the landmark measured using a laser rangefinder, and known coordinates of the position of the landmark; or (2) via triangulation based on two landmarks with respective known coordinates and respective directions measured by the ADU. The coordinates of the position of the OOI can then be calculated using a geolocation algorithm based on the calculated targeting system coordinates, and a measured direction and a measured range to the OOI. The calculated coordinates of the position of the OOI can be used immediately or later by the targeting system operator to target the OOI.

One aspect of the subject matter disclosed in detail below is an apparatus for geolocating an object of interest, comprising: a rangefinder configured to measure a range along a line-of-sight that intersects an object; an attitude determination unit co-aligned with the rangefinder and configured to measure azimuth and elevation angles of the line-of-sight; a non-transitory tangible computer-readable storage medium storing coordinates of a position of a first landmark; and a computer configured to execute the following operations: calculating coordinates of a position of the apparatus based at least in part on measurements of the azimuth and elevation angles of a first line-of-sight that intersects the first landmark received from the compass, and the coordinates of the position of the first landmark retrieved from the non-transitory tangible computer-readable storage medium; and calculating coordinates of a position of an object of interest based on a measurement of a range along a second line-of-sight to the object of interest received from the rangefinder, measurements of the azimuth and elevation angles of the second line-of-sight received from the compass, and the calculated coordinates of the position of the apparatus.

In accordance with one embodiment, the computer is configured to calculate the coordinates of the position of the apparatus based also in part on a measurement of a range along the first line-of-sight to the first landmark received from the rangefinder.

In accordance with another embodiment, the non-transitory tangible computer-readable storage medium also stores coordinates of a position of a second landmark, and the computer is configured to calculate the coordinates of the position of the apparatus based also in part on measurements of the azimuth and elevation angles of a third line-of-sight that intersects the second landmark received from the compass and the coordinates of the position of the second landmark retrieved from the non-transitory tangible computer-readable storage medium. On one implementation, the computer is configured to calculate the coordinates of the position of the apparatus by calculating respective directions for two lines and then calculating the coordinates of a midpoint of a shortest segment between the two lines.

Another aspect of the subject matter disclosed in detail below is a method for geolocating an object of interest using a targeting device, comprising: (a) measuring a range to a landmark along a first line-of-sight that intersects the landmark; (b) measuring azimuth and elevation angles of the first line-of-sight; (c) acquiring coordinates of a position of the landmark; (d) calculating coordinates of a position of the targeting device based on the measured range to the landmark, the measured azimuth and elevation angles of the first line-of-sight, and the coordinates of the position of the landmark; (e) measuring a range to an object of interest along a second line-of-sight that intersects the object of interest; (f) measuring azimuth and elevation angles of the second line-of-sight; and (g) calculating coordinates of a position of the object of interest based on the measured range to the object of interest, the measured azimuth and elevation angles of the second line-of-sight, and the calculated coordinates of the position of the targeting device.

A further aspect of the subject matter disclosed in detail below is a method for geolocating an object of interest using a targeting device, comprising: (a) measuring azimuth and elevation angles of a first line-of-sight that intersects a first landmark; (b) acquiring coordinates of a position of the first landmark; (c) measuring azimuth and elevation angles of a second line-of-sight that intersects a second landmark; (d) acquiring coordinates of a position of the second landmark; (e) calculating coordinates of a position of the targeting device based on the measured azimuth and elevation angles of the first and second lines-of-sight, and the coordinates of the positions of the first and second landmarks; (f) measuring a range to an object of interest along a third line-of-sight that intersects the object of interest; (g) measuring azimuth and elevation angles of the third line-of-sight; and (h) calculating coordinates of a position of the object of interest based on the measured range to the object of interest, the measured azimuth and elevation angles of the third line-of-sight, and the calculated coordinates of the position of the targeting device.

As used herein, the terms "position" and "location" are synonymous. The term "location" should not be construed to include both position and orientation.

Other aspects of systems and methods for determining the geolocation of targets when GPS signals are unavailable to a targeting system are disclosed below.

BRIEF DESCRIPTION OF THE DRAWINGS

Reference will hereinafter be made to the drawings in which similar elements in different drawings bear the same reference numerals.

DETAILED DESCRIPTION

Illustrative embodiments of systems and methods for determining the geolocation of an OOI when GPS signals are unavailable are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
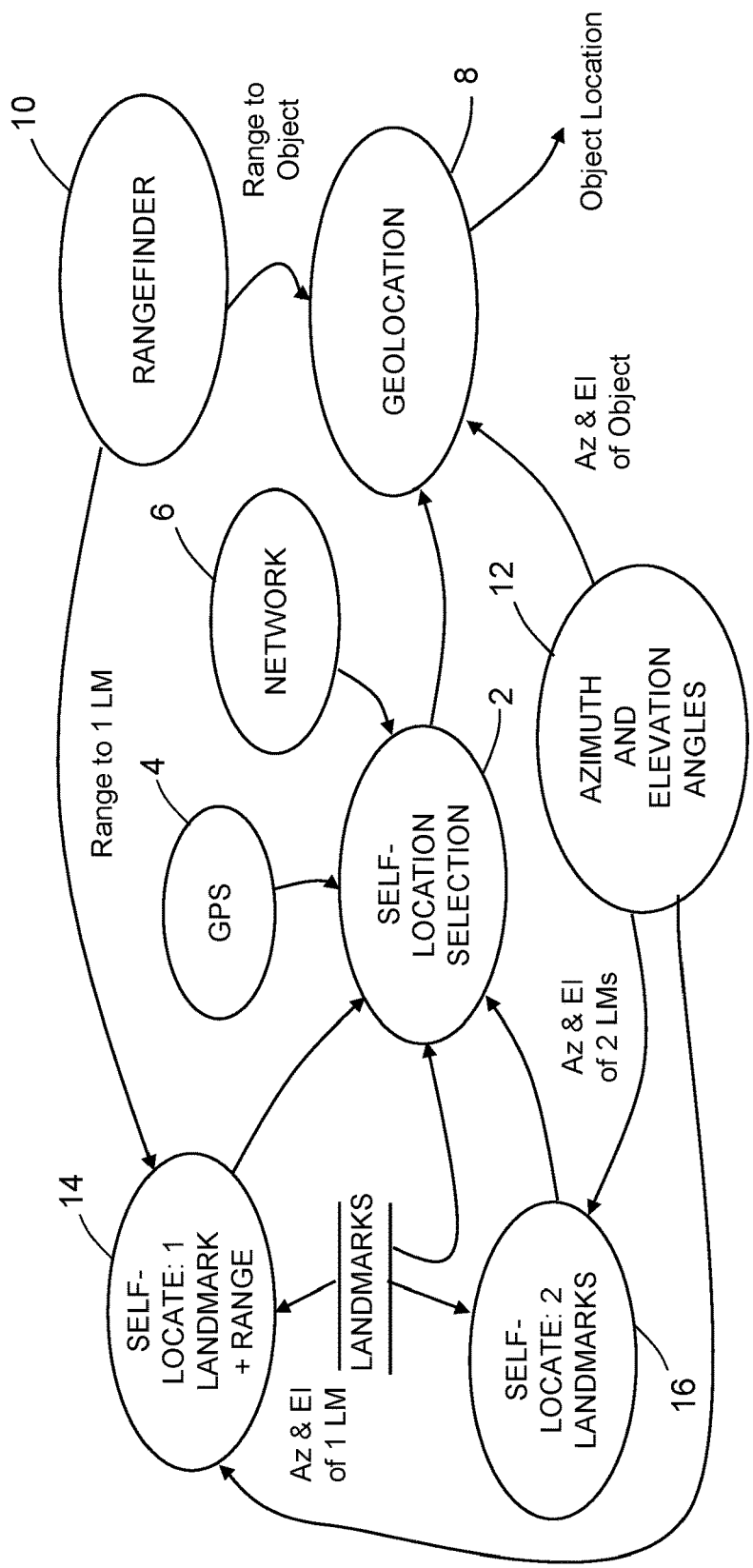
FIG. 1 is a flowchart identifying the capabilities of a targeting system that is configured to geolocate an object of interest in multiple ways.

FIG. 1 is a flowchart identifying the capabilities of a targeting system in accordance with one embodiment that is configured to geolocate an OOI in multiple ways. The system operator first must select a method for self-locating the targeting system (step 2). When the targeting system is receiving GPS signals (step 4), then the targeting system is configured to determine its own location using those GPS signals. The targeting system is also configured to receive a message containing data representing its own location from an external source (e.g., an aircraft) via a network (step 6). In the absence of GPS signals and location messaging, the coordinates of the position of the targeting system can be calculated using a self-location algorithm either based on a measured heading (i.e., azimuth and elevation angles of a line-of-sight) and a measured range to one landmark and known coordinates of the position of the landmark (step 14), or via triangulation based on respective measured headings to two landmarks having known coordinates (step 16). In the self-location method that uses one landmark (step 14), the targeting system uses a range to the landmark measured by a rangefinder 10 and azimuth and elevation angles of the line-of-sight to the landmark measured by an attitude determination unit (ADU) 12. In the self-location method that uses two landmarks (step 16), the targeting system uses respective azimuth and elevation angles of the respective lines-of-sight to the two landmarks as measured by the ADU 12.

Depending on which of the two landmark-based self-location techniques is selected in step 2, the targeting system uses either the results of step 14 or the results of step 16 to geolocate an OOI (step 8). The coordinates of the position of the OOI are calculated in step 8 using a geolocation algorithm based on the calculated coordinates of the position of the targeting system, a measured direction (i.e., azimuth and elevation angles of a line-of-sight) to the OOI and a measured range from the targeting system to the OOI. In step 8, the targeting system uses a range to the OOI measured by the rangefinder 10 and azimuth and elevation angles of the line-of-sight to the OOI measured by the ADU 12. The calculated coordinates of the position of the OOI (indicated by the arrow labeled "Object Location" in FIG. 1) can be used immediately or later by the targeting system operator to target the OOI.

The ADU 12 may be of any type so long as it provides (i.e., measures) heading, pitch attitude, and roll attitude of its line-of-sight (LOS). The rangefinder 10 may be of any type so long as it provides (i.e., measures) the range along the LOS. In accordance with an embodiment having the capabilities identified in FIG. 1, the targeting system also comprises a GPS receiver and antenna (not shown in FIG. 1). However, other self-location sensors could be utilized. The targeting system further comprises a non-transitory tangible computer-readable storage medium for storing coordinates of known landmarks to allow calculation of targeting system self-location given the azimuth and elevation angles to two landmarks or the range and azimuth and elevation angles to one landmark.

As will be disclosed in detail below with reference to FIG. 7, a targeting system having the capabilities identified in FIG. 1 preferably further comprises the following components: an imager, or imagers, typically magnified, to allow the operator to orient the LOS; an overlay symbology function for the imager display to show ongoing knowledge of directions to objects; and an ability to retain mechanical co-alignment of the ADU, rangefinder, and imager(s) to achieve a common system LOS (small translational (side-by-side) displacements of separate sensor/imager LOSs is trivial; a common LOS may really be a set of closely arranged parallel LOSs).

Supplemental data may be used depending on the nature of the ADU and availability of GPS signals. These may include one or more of the following: a geoid height database; the NGDC World Magnetic Model; defense terrain elevation data; and a georegistered digital map, with or without imagery.

Before describing various embodiments having the capabilities identified in FIG. 1, the relevant frames of reference for the measurements of interest will now be described in detail. A frame of reference is a Cartesian coordinate system defined by three orthonormal directions away from a specified origin. The three directions (i.e., axes) are respectively labeled X, Y and Z. There are two possible arrangements of the X, Y and Z axes, which may be referred to as "right-handed" and "left-handed". A left-handed frame of reference is shown in FIG. 2.

Figure 2:
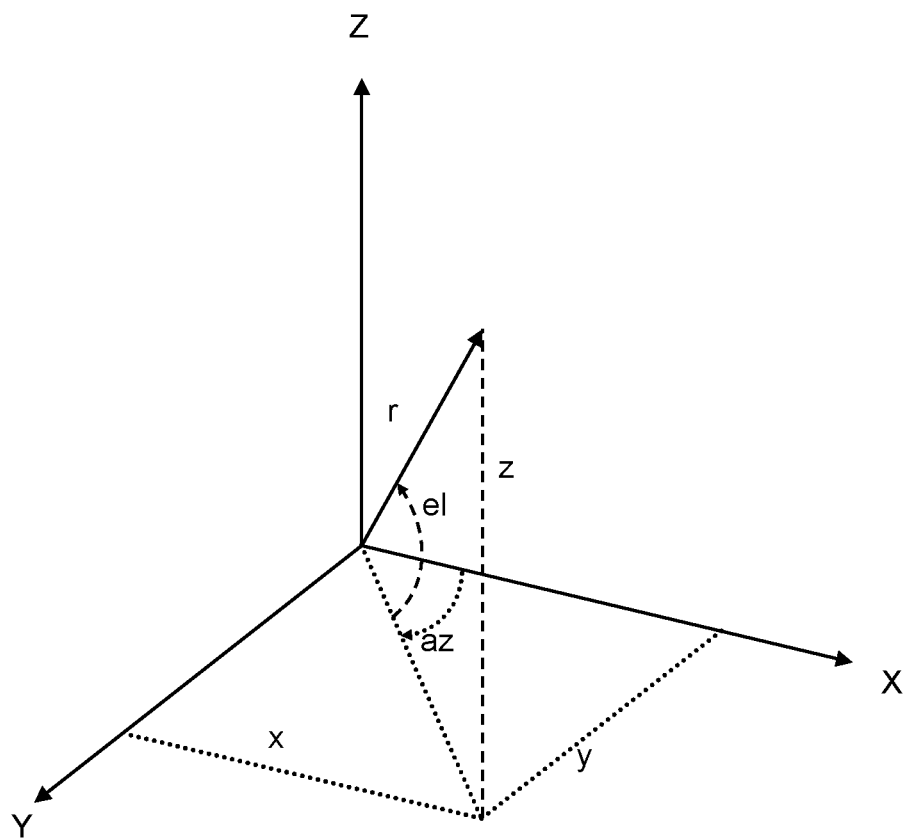
FIG. 2 is a diagram depicting a frame of reference (i.e., a Cartesian coordinate system) in which an azimuth angle (az) and an elevation angle (el) are defined.

FIG. 2 also shows the relationship of azimuth (labeled "az") and elevation (labeled "el") angles to the X, Y and Z axes. Azimuth is defined as positive in the direction from +X towards+Y. Elevation is defined as positive in the direction from the X-Y plane towards+Z. The relationships between the various angles and distances for an OOI located at a distance r from the origin of the Cartesian coordinate system with an azimuth angle "az" and an elevation angle "el" are (written in computer language, in which "atan 2" means "full-circle arctangent") as follows:

$az$=atan 2($y$,$x$)

$el$=atan 2($z$,($x^2+y^2$)$^{1/2}$)

$r$=($x^2+y^2+z^2$)$^{1/2}$ $r$ cos($el$)=($x^2+y^2$)$^{1/2}$ $x$=$r$ cos($el$)cos($az$)

$y$=$r$ cos($el$)sin($az$)

$z$=$r$ sin($el$)

Figure 3:
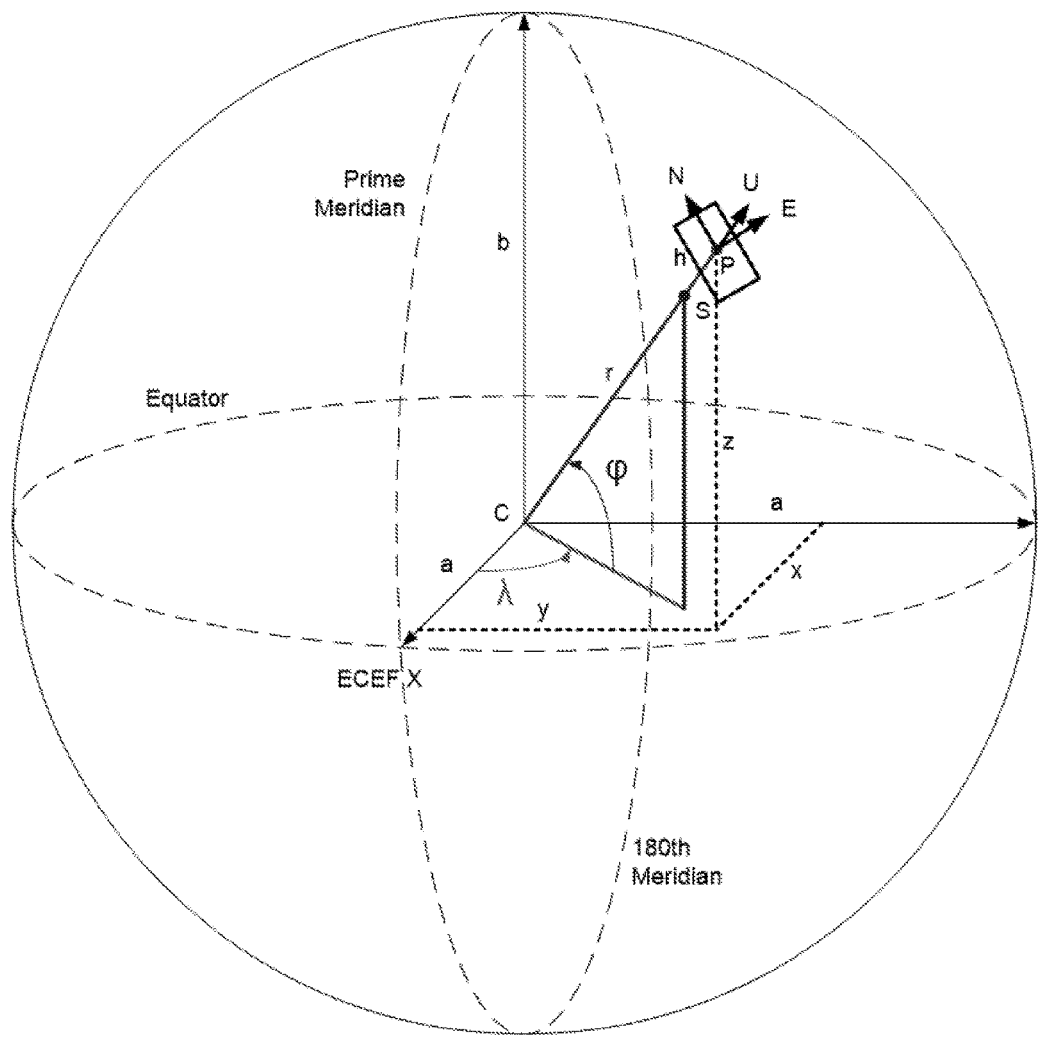
FIG. 3 is a diagram depicting an Earth-centered, Earth-fixed (ECEF) frame of reference with defining parameters for the reference system used by the GPS and a graphic representing the Earth Model.

The Earth-centered, Earth-fixed (ECEF) frame of reference is referred to extensively in the following detailed description. The origin of the ECEF frame of reference is the center of the Earth, with X passing through the intersection of the Equatorial and Prime Meridian Great Circles, and Z pointing through the North Pole. The ECEF frame of reference is right-handed. FIG. 3 is a diagram depicting the ECEF frame of reference with defining parameters for the reference system used by the GPS and a graphic representing the Earth Model. Latitude and longitude are the names of elevation and azimuth, respectively, in the ECEF frame of reference.

More specifically, FIG. 3 provides a graphic and defining parameters for the World Geodetic System (hereinafter "WGS84"), which is the frame of reference currently used by the GPS. The WGS84 frame of reference defines an ellipse with its minor axis in ECEF Z and its major axis in the plane of ECEF Y and ECEF X. The ellipse is rotated about ECEF Z to form a surface of revolution. The surface of revolution is the Earth Model. The height h of point P in FIG. 3 is defined as its distance from the Earth Model along a ray extending from the ECEF origin through point P. Since the Earth Model is defined by an ellipse with unequal axis lengths, height h is latitude dependent. The local geodetic frame of reference, including North (N), East (E) and Up (U), is also shown in FIG. 2.

The WGS84 standard defines a reference ellipsoid for Earth as follows (again using computer language): ellipsoid semi-major axis length a=6.378137 e6 m; ellipsoid flattening f is defined by 1/f=2.98257223563 e2; and ellipsoid semi-minor axis length b=a(1−f). Other terms which appear in FIG. 3 are defined as follows: P—point of interest; C—ECEF origin (center of Earth); ECEF X, Y, Z—ECEF directions; x, y, z—ECEF coordinates of P; S—point on ellipsoid directly "below" P; h—height of P above S (also called altitude); λ—longitude (generically, azimuth); φ—latitude (generically, elevation); r—distance from C to S (since a≠b, r is latitude dependent); and E, N, U—the local geodetic directions East, North, Up from P.

The coordinates P(x,y,z) of point P may be found from φ, λ and h by first finding r according to the following equation:

$r=a/(1-(1-b^2/a^2)\sin^2\varphi)^{1/2}$

Then x=(h+r) cos(φ) cos(λ); y=(h+r) cos(φ) sin(λ); and z=(h+rb$^2$/a$^2$) sin(φ).

The relationship between the local geodetic coordinate system (ENU) and an ECEF-parallel coordinate system with the same origin is given by the following transformation matrix from local geodetic (G) to ECEF-parallel (E):

$$CGE = \begin{bmatrix} -\sin(\lambda) & \cos(\lambda) & 0 \\ -\cos(\lambda)\sin(\varphi) & -\sin(\lambda)\sin(\varphi) & \cos(\varphi) \\ \cos(\lambda)\cos(\varphi) & \sin(\lambda)\cos(\varphi) & \sin(\varphi) \end{bmatrix}$$

An additional frame of reference requiring definition is the line-of-sight (LOS) frame of reference. LOS X is along the coaligned imager/rangefinder axis. LOS Z is "up" as seen on the imagers. LOS Y is "right" as seen on the imagers.

In addition, the attitude sensor has a frame of reference referred to herein as "Body". This is the reference frame of reference of the ADU, which may be misaligned with the LOS frame of reference. Mounting compensations in roll, pitch, and yaw are used to correct for these differences.

Finally, the term "magnetic declination" is used herein. If a compass is used for determining heading to a point or object, the difference between the direction to the Magnetic Pole and true North is important. Magnetic declination is the angle between true North and magnetic North, and is positive when magnetic North is east of true North. This can be expressed by the following equation: True Bearing=Magnetic Bearing+Magnetic Declination.

Geolocation

To establish the location of a remote object, the targeting system operator directs an imager toward the OOI and centers the OOI in the image. The operator then uses a rangefinder to find the OOI's range, i.e., the distance from the targeting system to the OOI. A computer of the targeting system is configured to use the system's position and attitude and the range from the system to the OOI to compute the coordinates of the position of the OOI. The geolocation inputs to the computer may include the following information: Range—range to OOI (measured by the rangefinder); $R_C$—roll compensation to ADU frame of reference (a measured value); $P_C$—pitch compensation to ADU frame of reference (a measured value); $Y_C$—yaw compensation to ADU frame of reference (a measured value); $R_A$—roll attitude (measured by the ADU); $P_A$— pitch attitude (measured by the ADU); $Y_A$— yaw attitude (heading relative to magnetic North measured by the ADU); $Y_D$—magnetic declination; LAT—geodetic latitude (WGS84) of the targeting system (determined using GPS signals or landmark-based self-location); LON—geodetic longitude (WGS84) of the targeting system (determined using GPS signals or landmark-based self-location); H—geodetic height (WGS84) of the targeting system (determined using GPS signals or landmark-based self-location).

Notationally, a 3×3 single-axis transformation matrix is denoted as <angle>, where <angle> will be one of the angles given above. There are three forms used for the single-axis 3×3 matrix. The particular form is determined by the axis that the transformation matrix is transforming about. The three forms for pitch, yaw and roll are as follows:

$$\text{Pitch:} \begin{bmatrix} \cos<\text{angle}> & 0 & -\sin<\text{angle}> \\ 0 & 1 & 0 \\ \sin<\text{angle}> & 0 & \cos<\text{angle}> \end{bmatrix}$$

$$\text{Yaw:} \begin{bmatrix} \cos<\text{angle}> & \sin<\text{angle}> & 0 \\ -\sin<\text{angle}> & \cos<\text{angle}> & 0 \\ 0 & 0 & 1 \end{bmatrix}$$

$$\text{Roll:} \begin{bmatrix} 1 & 0 & 0 \\ 0 & \cos<\text{angle}> & \sin<\text{angle}> \\ 0 & -\sin<\text{angle}> & \cos<\text{angle}> \end{bmatrix}$$

It is usually obvious by the name of the angle which form is used.

When one or more single-axis 3×3 transformation matrices have been multiplied, the resulting matrix is conventionally called a direction cosine matrix and denoted by Cxy, where x and y denote respective frames of reference (L—line-of-sight; B—body; G—geodetic; E—ECEF-parallel). The name may be interpreted as the matrix that transforms from the x frame of reference to the y frame of reference.

The geolocation algorithm comprises operations performed by a digital computer based on computer instructions (i.e., routines) stored in a non-transitory tangible computer-readable storage medium. These computer operations (written in computer language) include the generation of the following transformation matrices:

// LOS to Body (correct for sensor-to-compass misalignment)

$CLB=[Y_C][P_C][R_C]$

// Body to Geodetic $CBG=[Y_A+Y_D][P_A][R_A]$

// Geodetic to ECEF-parallel
// [LAT] uses the pitch matrix form, [LON] uses the roll matrix form $$CGE = \begin{bmatrix} 0 & 0 & 1 \\ 0 & -1 & 0 \\ 1 & 0 & 0 \end{bmatrix} [-LON][-LAT]$$

// ECEF-parallel to Geodetic $CEG=\text{transpose}(CGE)$

// LOS to ECEF-parallel $CLE=CGE\ CBG\ CLB$

// ECEF-parallel to LOS $CEL=\text{transpose}(CLE)$

After the transformation matrices have been generated, the computer calculates the ECEF position of the targeting system using a=6.378137e6 and f=1/2.98257223563e2. (In computer language, the "=" sign does not mean "equal to" but rather means GET (e.g., retrieve from a non-transitory tangible storage medium) that value and set the parameter to the gotten value.) In particular, the computer calculates $b=a(1-f)$ and $N=a/(1-(1-b^2/a^2)\sin^2(\text{lat}))^{1/2}$. Then the computer calculates the system's ECEF coordinates as follows:

$ECEFx=(h+N)\cos(\text{lat})\cos(\text{lon})$ $ECEFy=(h+N)\cos(\text{lat})\sin(\text{lon})$ $ECEFz=(h+Nb^2/a^2)\sin(\text{lat})$ After the ECEF position of the targeting system has been calculated, the computer then calculates the position of an OOI in ECEF coordinates as follows:

$$\begin{bmatrix} ECEFxo \\ ECEFyo \\ ECEFzo \end{bmatrix} = CLE \begin{bmatrix} \text{Range} \\ 0 \\ 0 \end{bmatrix} + \begin{bmatrix} ECEFx \\ ECEFy \\ ECEFz \end{bmatrix}$$

After the position of the OOI in the ECEF frame of reference has been calculated, the computer then converts that ECEF position into the corresponding lat/lon/h coordinates of the position of the OOI in the WGS84 frame of reference using the following algorithm.

To determine the longitude of the OOI, consider that y/x may be expressed (using the equations given above) as:

$y/x=((h+N)\cos(\text{lat})\sin(\text{lon}))/((h+N)\cos(\text{lat})\cos(\text{lon}))$, from which the computer obtains $y/x=\sin(\text{lon})/\cos(\text{lon})$ and $y/x=\tan(\text{lon})$, or lon=atan 2(y,x) ("atan 2" is used because a full circle arctangent is needed). Finding latitude and height is independent of longitude, and so can be worked in the plane of the Meridian containing the OOI.

Figure 4:
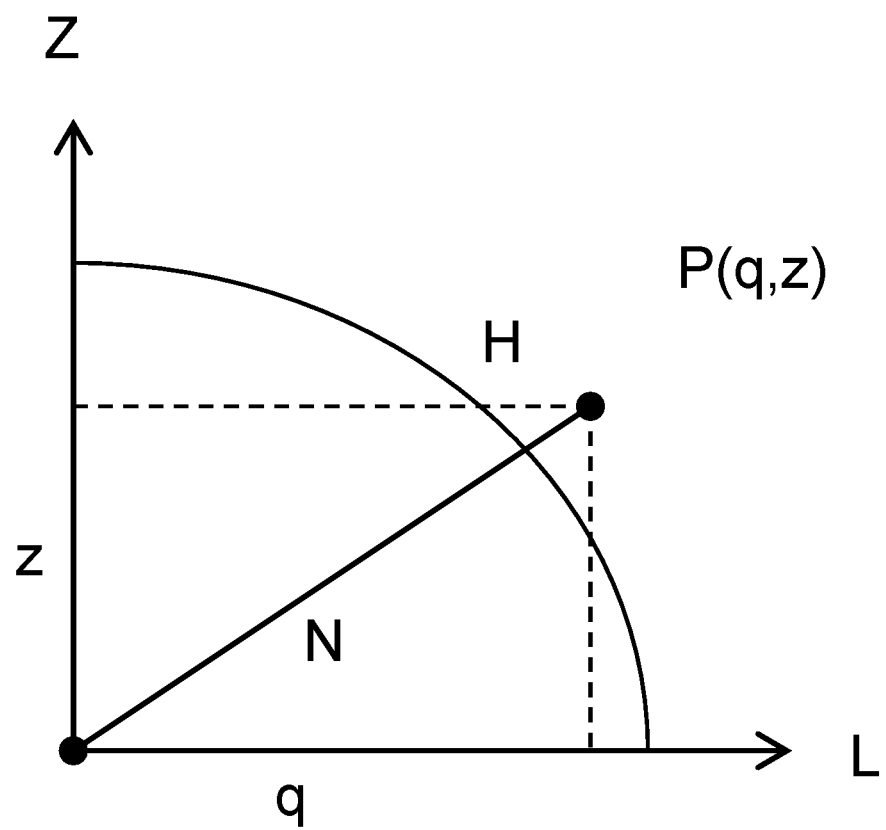
FIG. 4 is a diagram representing a plane formed from the ECEF Z axis and a point representing a location of an object of interest.

FIG. 4 is a diagram representing a plane formed from the ECEF Z axis and a point representing a location of an OOI. The cross-Z component is shown in FIG. 4 as "q", the root of the sum of the squares of x and y, i.e., $q=(x^2+y^2)^{1/2}$. Since $q^2=(x^2+y^2)$, one may substitute for x and y to give:

$q^2=((h+N)\cos(\text{lat})\cos(\text{lon}))^2+((h+N)\cos(\text{lat})\sin(\text{lon}))^2$ or $q^2=(h+N)^2\cos^2(\text{lat})\cos^2(\text{lon})+(h+N)^2\cos^2(\text{lat})\sin^2(\text{lon})$.

Factoring, one gets the following equation:

$q^2=(h+N)^2\cos^2(\text{lat})(\cos^2(\text{lon})+\sin^2(\text{lon}))$.

Next, one can apply the trigonometric identity $\cos^2(\theta)+\sin^2(\theta)=1$ to obtain the following equation:

$$q^2=(h+N)^2\cos^2(\text{lat}),$$

which leads to:

$$q=(h+N)\cos(\text{lat})$$

or $$h=q/\cos(\text{lat})-N.$$

Working with the expression for ECEF z:

$$z=(h+Nb^2/a^2)\sin(\text{lat})$$

$$h=z/\sin(\text{lat})-Nb^2/a^2.$$

Equating these expressions for h (that is, $h=q/\cos(\text{lat})-N=z/\sin(\text{lat})-Nb^2/a^2$) and solving for z gives the following sequence:

$$z/\sin(\text{lat})-Nb^2/a^2=q/\cos(\text{lat})-N$$

$$z/\sin(\text{lat})=q/\cos(\text{lat})-N+Nb^2/a^2$$

$$z/\sin(\text{lat})=q/\cos(\text{lat})-N(1-b^2/a^2)$$

$$z/\sin(\text{lat})=q/\cos(\text{lat})-e^2N$$

$$z=\sin(\text{lat})(q/\cos(\text{lat})-e^2N).$$

This last expression for z is not algebraically solvable for lat, but it does provide a basis for an iterative function to determine a latitude estimate giving a z sufficiently close to the supplied ECEF z. One may recall that q is a function of ECEF x and ECEF y, and N is a function of the latitude estimate, so for a given scenario, q would be found once but N would be recalculated with each new latitude estimate.

For an estimate of the latitude of the OOI called lat_est, the error function is then:

$$z\_\text{error}=\sin(\text{lat\_est})(q/\cos(\text{lat\_est})-e^2(a/(1-e^2\sin 2(\text{lat\_est}))^{1/2}))-Z.$$

One of several conventional root-finding algorithms may be employed to find a lat_est producing a z_error of sufficiently small magnitude. The Secant Method has been employed successfully. This method is fast, and does not rely on initial bracketing of the root.

With lat for the OOI determined, the equation $h=r/\cos(\text{lat})-N$ can be employed to determine h for the OOI.

Geolocation Error

In accordance with some embodiments, the circular error (CE) and vertical error (VE) for a geolocation are estimated using dynamic and static parameters. These errors can be scaled to fit a desired confidence interval. If the errors are too high for a given confidence level, then the system operator has the option treating the computed OOI geolocation as invalid. All system parameters are treated as independent variables.

The computer of the targeting system executes a geolocation error estimation algorithm that uses the following dynamic system parameters: Z—the z-score for the confidence interval (source: normal distribution); Range—range to OOI (source: laser rangefinder (LRF)); HDOP—GPS horizontal dilution of precision (source: GPS); VDOP—GPS vertical dilution of precision (source: GPS); $GPS_H$—GPS horizontal error, $1\sigma$ (source: calculated); and $GPS_V$—GPS vertical error, $1\sigma$ (source: calculated).

During execution of the geolocation error estimation algorithm, the computer also uses the following static system parameters: LRF—range error, $1\sigma$ (source: LRF); $C_H$—compass horizontal error, $1\sigma$ (source: DMC); $C_V$—compass vertical error, $1\sigma$ (source: DMC); BS—"BoreSight"; DMC-LRF alignment error, $1\sigma$ (source: manufacturing); and BW—beamwidth of LRF, $1\sigma$ (source: LRF).

The following additional errors are defined:

| #define | ANG_HORZ_ERROR | ($C_H*C_H$ + BS*BS + BW*BW) |
|---|---|---|
| #define | ANG_VERT_ERROR | ($C_v*C_v$ + BS*BS + BW*BW) |
| #define | LRF_SQ | (LRF*LRF) |
| #define | UERE | 3.72 |
| #define | HDOP_TERM | (UERE * 1.7308/1.95997) |
| #define | VDOP_TERM | (UERE * 1.9600/1.95997) |

The value 3.72 for the UERE was taken from a Performance Specification for the particular GPS receiver used in one implementation.

The following computations are performed by the computer to arrive at the circular and vertical errors:

$$GPS_H = HDOP*HDOP\_TERM$$

$$GPS_V = VDOP*VDOP\_TERM$$

$$CE = Z*(2*GPS_H*GPS_H + LRF\_SQ + R*R*ANG\_HORZ\_ERROR)^{1/2}$$

$$VE = Z*(GPS_V*GPS_V + R*R*ANG\_VERT\_ERROR)^{1/2}$$

Self-Location Using Headings to Two Landmarks

In accordance with one embodiment, when the targeting system is situated in an environment in which there is no access to GPS signals, the targeting system operator has the option of self-locating the targeting system using two landmarks and then geolocating the OOI using the targeting system's position and attitude and the range to the OOI. In the absence of GPS signals, the targeting system coordinates can be calculated using a self-location algorithm based on triangulation of two landmarks with respective known coordinates and respective directions (i.e., azimuth and elevation angles of the lines-of-sight to the two landmarks) measured by the ADU. The coordinates of the position of the OOI can then be calculated using a geolocation algorithm based on the calculated coordinates of the position of the targeting system, and a measured heading of the line-of-sight and a measured range to the OOI. The calculated coordinates of the position of the OOI can then be communicated by digital or voice message to a person responsible for programming a weapon.

Figure 5:
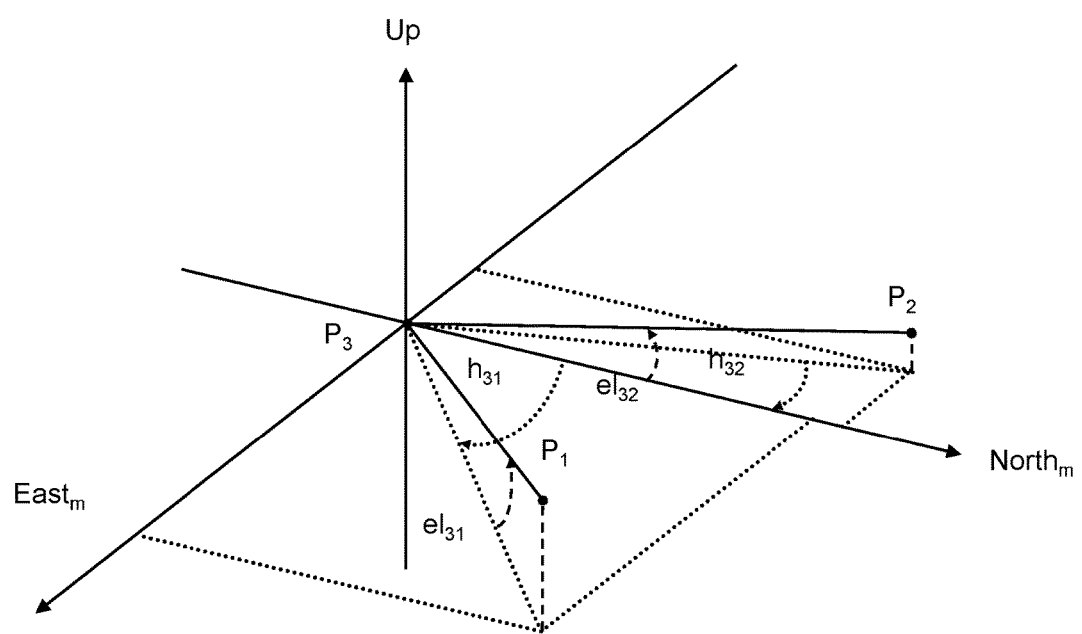
FIG. 5 is a diagram representing the heading and elevation to two landmarks (the locations of which are indicated by points $P_1$ and $P_2$) relative to a targeting system located at the origin (indicated by point $P_3$) of a local geodetic system.

FIG. 5 is a diagram representing the respective headings and elevations to two landmarks (the locations of which are indicated by points $P_1$ and $P_2$) relative to a targeting system located at the origin (indicated by point $P_3$) of a local geodetic system. The subscript "m" means that North and East are magnetic. In the following discussion, bold parameters are non-scalar, e.g., lines, points and vectors.

The method for self-location using two landmarks starts with the following known parameters: P1—ECEF coordinates; P2—ECEF coordinates; $h_{31}$—magnetic heading from P3 to P1, Local Magnetic; $el_{31}$—elevation (pitch) angle from P3 to P1, Local Magnetic; $h_{32}$—magnetic heading from P3 to P2, Local Magnetic; and $el_{32}$—elevation (pitch) angle from P3 to P2, Local Magnetic The method for self-location using two landmarks seeks to find the following parameters: P3—ECEF coordinates; CE estimate for P3 (Local Geodetic); and VE estimate for P3 (Local Geodetic). The "Library" function map_to_circle (angle) adds/subtracts $2*\pi$ to/from an angle until the angle is in the range $[-\pi, \pi]$. The solution (written in computer language) is as follows:

1) Use World Magnetic Model to find Declination of P1 and Declination of P2. Find D as their average.
2) Mag Compass reads True Heading—Declination, so add D to both headings to get true heading:

$th_{31}$=map_to_circle($h_{31}$+D)

$th_{32}$=map_to_circle($h_{32}$+D)

3) Convert headings and elevations to be landmark-relative $th_{13}$=map_to_circle($\pi$+$th_{31}$)

$el_{13}$=$-el_{31}$ $th_{23}$=map_to_circle($\pi$+$th_{32}$)

$el_{23}$=$-el_{32}$

4) Find Local Geodetic direction vectors for the segments P1P3 and P2P3.

$$u_{13} = \begin{bmatrix} \cos(th_{13}) \\ \sin(-th_{13}) \\ \sin(el_{13}) \end{bmatrix}$$

$$u_{23} = \begin{bmatrix} \cos(th_{23}) \\ \sin(-th_{23}) \\ \sin(el_{23}) \end{bmatrix}$$

5) Transform the unit vectors into the ECEF system. The direction cosine matrix for transforming from Geodetic to ECEF is unique for each point.

$e_{13}$=$CGE_1$*$u_{13}$ $e_{23}$=$CGE_2$*$u_{23}$

Note:

The targeting device now has points and directions for two lines in the ECEF frame of reference. The targeting device then seeks their intersection at P3, but due to measurement error, they are most likely skew. The algorithm will test for the parallel case. Assuming skewness, P3 will be assigned the coordinates of the calculated midpoint of the shortest segment between the two lines. The compass and estimated landmark accuracy will be used to estimate CE and VE.

6) (skew lines case) A unique segment between lines L1=P1+s($e_{13}$) and L2=P2+t($e_{23}$) exists at the point where they are closest. Call this segment C, with endpoints Ps on L1 and Pt on L2. C is orthogonal to both L1 and to L2, so the dot product of L1's direction vector with C and the dot product of L2's direction vector with C are both 0, that is:

$e_{13}\cdot C$=0

$e_{23}\cdot C$=0

Further,

C=Ps−Pt=(P1+s($e_{13}$))−(P2+t($e_{23}$))=P1−P2+s($e_{13}$)−t($e_{23}$) for some values of s and t. Let C0=P1−P2, then C=C0+s($e_{13}$)−t($e_{23}$)

Substitute C into the first dot product $e_{13}\cdot(C0+s(e_{13})-t(e_{23}))$=0

Dot product is distributive;

$e_{13}\cdot C0+e_{13}\cdot s(e_{13})-e_{13}\cdot t(e_{23})$=0 s and t are scalars, allowing $(e_{13}\cdot e_{13})s-(e_{13}\cdot e_{23})t=-e_{13}\cdot C0$ (1)

Similarly, the second dot product becomes $(e_{23}\cdot e_{13})s-(e_{23}\cdot e_{23})t=-e_{23}\cdot C0$ (2)

7) To simplify terms, assign these computable variables:

$a=e_{13}\cdot e_{13}$ (note dot product results are scalar)

$b=e_{13}\cdot e_{23}$ $c=e_{23}\cdot e_{23}$ $d=e_{13}\cdot C0$ $e=e_{23}\cdot C0$ Then substitute into Eqs. (1) and (2):

$as-bt=-d$, or $t=(as+d)/b$ (3)

$bs-ct=-e$, or $s=(ct-e)/b$ (4)

Now substitute t as determined from Eq. (3) into Eq. (4):

$bs-c((as+d)/b)=-e$ (5)

And rearrange for s:

$s=(be-cd)/(ac-b^2)$ (6)

Similarly, substitute s as determined from Eq. (6) into Eq. (3) to get $t=(ae-bd)/(ac-b^2)$ (7)

8) If $(ac-b^2)$=0, L1 and L2 are parallel and triangulation fails. Otherwise, find Ps=P1+s($e_{13}$)

Pt=P2+t($e_{23}$)

P3=0.5*(Ps+Pt)

The endpoints and midpoint are now known in ECEF coordinates; the midpoint is the triangulated location.

9) Evaluate the length of the segment against the error to be expected from using the compass as well as using landmark coordinates with some position error.
Compass heading error, radians, $1\sigma=\varepsilon_{hdg}$
Compass elevation error, radians, $1\sigma=\varepsilon_{el}$
Landmark horizontal position error, meters, $1\sigma=CE_{LM}$
Landmark vertical position error, meters, $1\sigma=LE_{LM}$
Because the same compass was used for both landmarks, the algorithm uses the higher of s or t instead of evaluating error for each line independently.

M=max(s,t)

With adjustment for a 90% confidence (factor of 1.645), find $CE90=1.645*(M*\varepsilon_{hdg}+CE_{LM})$ $VE90=1.645*(M*\varepsilon_{el}+LE_{LM})$ Cross-E90=RSS(CE90,VE90)

Segment half length=distance(Ps,P3)

If (Segment half length>Cross-E90) triangulation fails

Otherwise, report P3, CE90, VE90

Self-Location Using Heading and Range to One Landmark

In accordance with another embodiment, when the targeting system is situated in an environment in which there is no access to GPS signals, the system operator has the option of self-locating the targeting system using one landmark and then geolocating the OOI using the targeting system's position and attitude and the range to the OOI. In the absence of GPS signals, the targeting system coordinates can be calculated using a self-location algorithm based on a heading (i.e., azimuth and elevation angles of the line-of-sight) to one landmark measured by the ADU, a range to the landmark measured using a laser rangefinder, and known coordinates of the position of the landmark. The coordinates of the position of the OOI can then be calculated using a geolocation algorithm based on the calculated coordinates of the position of the targeting system, and a measured heading and a measured range to the OOI. The calculated coordinates of the position of the OOI can be used immediately or later by the targeting system operator to target the OOI.

Figure 6:
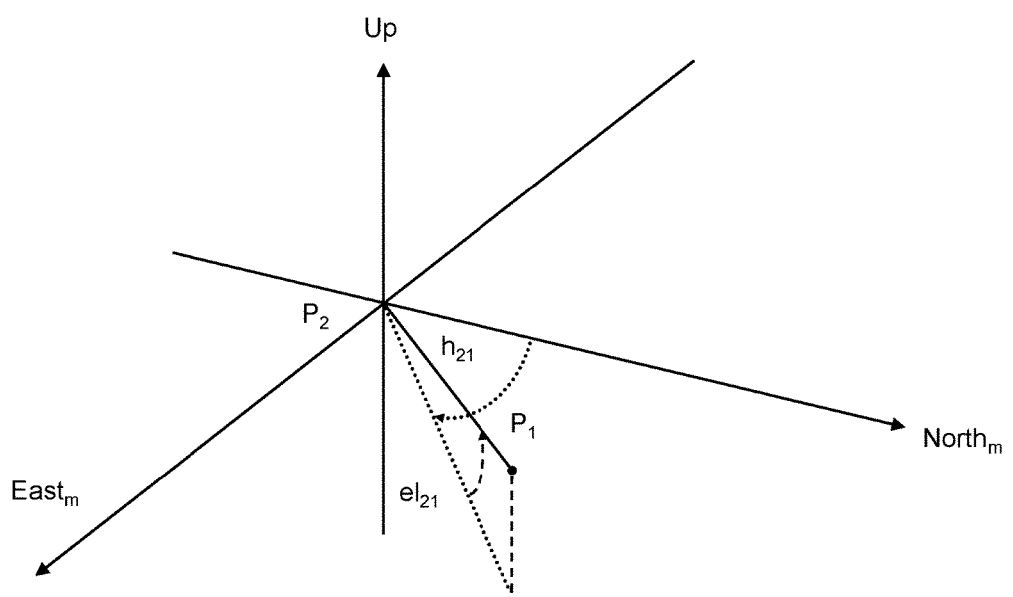
FIG. 6 is a diagram representing the heading and elevation to one landmark (the location of which is indicated by point $P_1$) relative to a targeting system located at the origin (indicated by point $P_2$) of a local geodetic system.

FIG. 6 is a diagram representing the heading and elevation to one landmark (the location of which is indicated by point $P_1$) relative to a targeting system located at the origin (indicated by point $P_2$) of a local geodetic system. The same conventions adopted in the above discussion of FIG. 5 are used in the following description of the self-location method using one landmark and the range to that landmark.

The method for self-location using two landmarks starts with the following known parameters: P1—ECEF coordinates; $h_{21}$—magnetic heading from P2 to P1, Local Magnetic; $el_{21}$—elevation (pitch) angle from P2 to P1, Local Magnetic; and R—line-of-sight Range from P2 to P1.

The method for self-location using two landmarks seeks to find the following parameters: P2: ECEF coordinates; CE estimate for P2 (Local Geodetic); and VE estimate for P2 (Local Geodetic). The solution (written in computer language) is as follows:

1) Use World Magnetic Model to find D, the declination of P1.
2) Mag Compass reads True Heading+Declination, so subtract D from heading to get true heading:

$th_{21}$=map_to_circle($h_{21}$−D)

3) Convert heading and elevation to be landmark-relative $th_{12}$=map_to_circle($\pi$+$th_{21}$)

$el_{12}$=−$el_{21}$

4) Find the body-to-ECEF direction cosine matrix at P1 using the true-heading and elevation from P1 to P2, and the Latitude and Longitude of P1.

$LLH$=ecef_to_LLH(P1)

$CBE$=form_CBE($LLH,th_{12},el_{12}$)

5) Use the body-to-ECEF matrix to find the ECEF offset of P2 from P1, and add P1 to give coordinates of P2

$$\begin{bmatrix} ECEFP2\,x \\ ECEFP2\,y \\ ECEFP2\,z \end{bmatrix} = CBE \begin{bmatrix} R \\ 0 \\ 0 \end{bmatrix} + \begin{bmatrix} ECEFP1\,x \\ ECEFP1\,y \\ ECEFP1\,z \end{bmatrix}$$

6) Estimate circular error and vertical error terms:
   Compass heading error, radians, 1σ=$\varepsilon_{hdg}$
   Compass elevation error, radians, 1σ=$\varepsilon_{el}$ $CE90$=1.645*($R$*$\varepsilon_{hdg}$+$CELM$)

$VE90$=1.645*($R$*$\varepsilon_{el}$+$LELM$)

Figure 7:
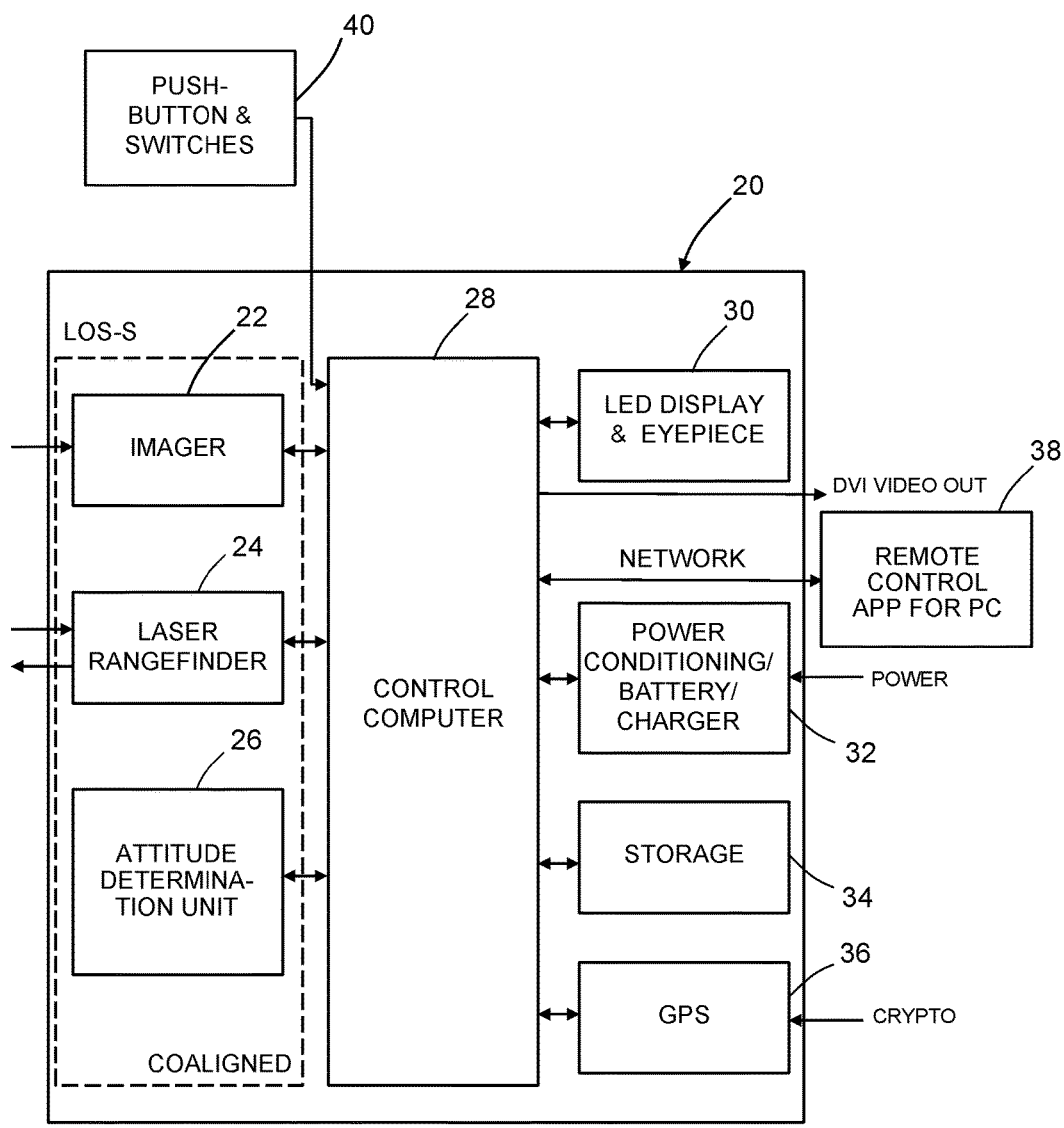
FIG. 7 is a block diagram identifying components of an integrated targeting system that is configured for use in performing the methods disclosed herein.

FIG. 7 is a block diagram identifying components of a lightweight, hand-held integrated laser targeting device 20 that is configured for use in performing the methods disclosed above. In accordance with the embodiment depicted in FIG. 7, the laser targeting device 20 comprises: an imager 22 (e.g., a color CMOS imager with band-select or a thermal imager); a laser rangefinder 24; an attitude determination unit (ADU) 26; and a control computer 28 which has two-way communication with imager 22, laser rangefinder 24 and ADU 26. The relative orientations of the imager 22, laser rangefinder 24 and ADU 26 are adjustable to enable co-alignment of their respective lines-of-sight.

In accordance with the embodiment depicted in FIG. 7, the laser targeting device 20 further comprises: an LED display and eyepiece unit 30; a power unit 32; a storage unit 34 (i.e., a non-transitory tangible computer-readable storage medium) for storing videos, snapshots, sensor points of interest and configuration information; a GPS unit 36 (incorporating an antenna and a receiver) for receiving encrypted GPS signals and communicating with the control computer 28; and buttons and switches 40 which the system operator uses to input commands to the control computer 28.

In accordance with a preferred embodiment, the control computer 28 is configured to execute computer instructions of various software applications, including applications for performing the following functions: graphical user interface (for display on the LED display), ranging, geolocation, self-location, managing sensor points of interest, video out, snapshot images, video recording and streaming, and communications (including a two-way cursor on the target and remote control). In accordance with the foregoing configuration, the control computer 28 is capable of two-way communication with the storage unit 34. In addition, the control computer 28 can be connected via a network to a remote control application 38 (running on a viewer) for a personal computer.

Range measurement is effected using the laser rangefinder 24. Laser rangefinders operate on the principle of measuring the time of flight of an intense, short-duration pulse of energy from the time it is produced by a transmitter assembly to the time the reflected pulse from the downrange target is detected by a receiver assembly. Since the speed of light is a known constant, the time of flight of the pulse can be used to calculate the distance to the downrange target. Laser rangefinders typically comprise transmitter, receiver and controller subassemblies. Presently, many implementations exist for a transmitter assembly to produce the desired high-intensity, short-duration pulse of energy. Beam forming and directing optics are used to focus the pulse on the downrange target. Characteristics of the transmitted pulse, such as temporal profile, spatial profile and wavelength, are preserved in the reflected pulse and may therefore be used to differentiate the reflected pulse from background or other interfering sources. The function of the receiver assembly is to collect the energy from the reflected pulse and detect its time of arrival. This is typically implemented using beam collecting optics to focus the incoming pulse on a photodetector. The receiving assembly must also discriminate the return pulse from background interfering sources.

The ADU 26 may comprise magnetic field sensors, inclination sensors, and a microprocessor configured to perform control and evaluation functions. In this case, the microprocessor is configured to calculate the current orientation with respect to the Magnetic North direction and the gravitational field direction from the measurement data of the sensors.

In accordance with the embodiment depicted in FIG. 7, a laser targeting device 20 or apparatus for geolocating an object of interest is provided that comprises a rangefinder 24 to measure a range along a line-of-sight that intersects the object of interest, an attitude determination unit 26 co-aligned with the rangefinder 24 and configured to measure azimuth and elevation angles of the line-of-sight, and a non-transitory tangible computer-readable storage medium storing coordinates of a position of at least a first landmark. The laser targeting device 20 or apparatus further comprises a control computer 24 configured to execute operations for calculating coordinates of a position of the apparatus based at least in part on measurements of the azimuth and elevation angles of a first line-of-sight that intersects the first landmark received from the compass, and the coordinates of the position of the first landmark retrieved from the non-transitory tangible computer-readable storage medium. The control computer 28 further executes operations for calculating coordinates of a position of the object of interest based on a measurement of a range along a second line-of-sight to the object of interest received from the rangefinder, measurements of the azimuth and elevation angles of the second line-of-sight received from the attitude determination unit, and the calculated coordinates of the position of the apparatus. In the event that position coordinates for the apparatus are not available via GPS, the control computer 24 is configured to calculate the coordinates of the position of the apparatus based on a first line-of-sight to either a first landmark having known coordinates for the position of the first landmark, or a first line-of-sight to a first landmark and a third line-of-sight to a second landmark with known coordinates for the positions of the first and second landmarks. For only a first landmark, the computer is configured to calculate the coordinates of the position of the apparatus based on measurements from the attitude determination unit of the first line-of-sight to the first landmark and known coordinates of the position of the first landmark. For both a first landmark and second landmark, the computer is configured to convert measurements of the azimuth and elevation angles for the first line-of-sight to the first landmark, and azimuth and elevation angles for the third line-of-sight to the second landmark, to respective directions for two lines (representing two line-of-sight directional vectors from each landmark to the position of the apparatus), and to calculate the coordinates of the apparatus position based on an approximate intersection of the two lines by determining a midpoint of the shortest segment between the two lines.

While systems and methods for targeting an object of interest have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

In the absence of explicit language indicating a particular sequence of steps, the method claims set forth hereinafter should not be construed to require that the steps recited therein be performed in alphabetical order (any alphabetical ordering in the claims is used solely for the purpose of referencing previously recited steps) or in the order in which they are recited. Similarly, in the absence of explicit language indicating non-concurrent steps, the method claims set forth hereinafter should not be construed to exclude any portions of two or more steps being performed concurrently.

The invention claimed is:

1. A system for targeting an object of interest, comprising:
a rangefinder configured to measure a range along a line-of-sight that intersects an object;
an attitude determination unit co-aligned with the rangefinder and configured to measure azimuth and elevation angles of the line-of-sight;
a non-transitory tangible computer-readable storage medium storing coordinates of a position of a first landmark;
a computer configured to execute the following operations:
calculating coordinates of a position of the range finder based at least in part on measurements of the azimuth and elevation angles of a first line-of-sight that intersects the first landmark received from the attitude determination unit, and the coordinates of the position of the first landmark retrieved from the non-transitory tangible computer-readable storage medium; and
calculating coordinates of a position of an object of interest based on a measurement of a range along a second line-of-sight to the object of interest received from the rangefinder, measurements of the azimuth and elevation angles of the second line-of-sight received from the attitude determination unit, and the calculated coordinates of the position of the apparatus; and
wherein the calculated coordinates of the position of the object of interest are communicated for programming a weapon to target the object.

2. The system as recited in claim 1, wherein the computer is configured to calculate the coordinates of the position of the apparatus based also in part on a measurement of a range along the first line-of-sight to the first landmark received from the rangefinder.

3. The system as recited in claim 2, wherein the non-transitory tangible computer-readable storage medium also stores coordinates of a position of a second landmark, and the computer is also configured to calculate the coordinates of the position of the apparatus based on measurements of the azimuth and elevation angles of the first line-of-sight, the coordinates of the position of the first landmark, measurements of the azimuth and elevation angles of a third line-of-sight that intersects the second landmark received from the attitude determination unit, and the coordinates of the position of the second landmark retrieved from the non-transitory tangible computer-readable storage medium.

4. The system as recited in claim 3, wherein the computer is configured to calculate the coordinates of the position of the apparatus by calculating respective directions for two lines in an ECEF frame of reference and then calculating the coordinates of a midpoint of a shortest segment between the two lines.

5. The system as recited in claim 1, wherein the non-transitory tangible computer-readable storage medium also stores coordinates of a position of a second landmark, and the computer is configured to calculate the coordinates of the position of the apparatus based also in part on measurements of the azimuth and elevation angles of a third line-of-sight that intersects the second landmark received from the attitude determination unit and the coordinates of the position of the second landmark retrieved from the non-transitory tangible computer-readable storage medium.

6. The system as recited in claim 5, wherein the computer is configured to calculate the coordinates of the position of the apparatus by calculating respective directions for two lines in an ECEF frame of reference and then calculating the coordinates of a midpoint of a shortest segment between the two lines.

7. The system as recited in claim 1, wherein the rangefinder is a laser rangefinder and the attitude determination unit is a digital magnetic compass.

8. The system as recited in claim 1, further comprising a GPS antenna and a GPS receiver.

9. A method for targeting an object of interest using a targeting device, comprising:
   (a) measuring a range to a landmark along a first line-of-sight that intersects the landmark;
   (b) measuring azimuth and elevation angles of the first line-of-sight;
   (c) acquiring coordinates of a position of the landmark;
   (d) calculating coordinates of a position of the targeting device based on the measured range to the landmark, the measured azimuth and elevation angles of the first line-of-sight, and the coordinates of the position of the landmark;
   (e) measuring a range to an object of interest along a second line-of-sight that intersects the object of interest;
   (f) measuring azimuth and elevation angles of the second line-of-sight;
   (g) calculating coordinates of a position of the object of interest based on the measured range to the object of interest, the measured azimuth and elevation angles of the second line-of-sight, and the calculated coordinates of the position of the targeting device; and
   (h) communicating the calculated coordinates of the object of interest for programming a weapon to target the object.

10. The method as recited in claim 9, wherein steps (a) and (e) are performed using a laser rangefinder.

11. The method as recited in claim 9, wherein steps (b) and (f) are performed using an attitude determination unit.

12. The method as recited in claim 9, wherein step (c) comprises retrieving the coordinates of the position of the landmark from a non-transitory tangible computer-readable storage medium.

13. The method as recited in claim 9, further comprising communicating the calculated coordinates to a weapons programmer by digital or voice message.

14. The method as recited in claim 9, further comprising operating the weapon in accordance with the programming.

15. A method for geolocating an object of interest using a targeting device, comprising:
   (a) measuring azimuth and elevation angles of a first line-of-sight that intersects a first landmark;
   (b) acquiring coordinates of a position of the first landmark;
   (c) measuring azimuth and elevation angles of a second line-of-sight that intersects a second landmark;
   (d) acquiring coordinates of a position of the second landmark;
   (e) calculating coordinates of a position of the targeting device based on the measured azimuth and elevation angles of the first and second lines-of-sight, and the coordinates of the positions of the first and second landmarks;
   (f) measuring a range to an object of interest along a third line-of-sight that intersects the object of interest;
   (g) measuring azimuth and elevation angles of the third line-of-sight; and
   (h) calculating coordinates of a position of the object of interest based on the measured range to the object of interest, the measured azimuth and elevation angles of the third line-of-sight, and the calculated coordinates of the position of the targeting device; and
   (i) communicating the calculated coordinates of the object of interest for programming a weapon to target the object.

16. The method as recited in claim 15, wherein the coordinates of the position of the targeting device are calculated by calculating respective directions for two lines in an ECEF frame of reference and then calculating the coordinates of a midpoint of a shortest segment between the two lines.

17. The method as recited in claim 15, wherein step (f) is performed using a laser rangefinder.

18. The method as recited in claim 15, wherein steps (a), (c) and (g) are performed using an attitude determination unit.

19. The method as recited in claim 15, wherein steps (b) and (d) comprise retrieving the coordinates of the position of the first and second landmarks from a non-transitory tangible computer-readable storage medium.

20. The method as recited in claim 15, further comprising communicating the calculated coordinates to a weapons programmer by digital or voice message.

* * * * *